Figure 1:
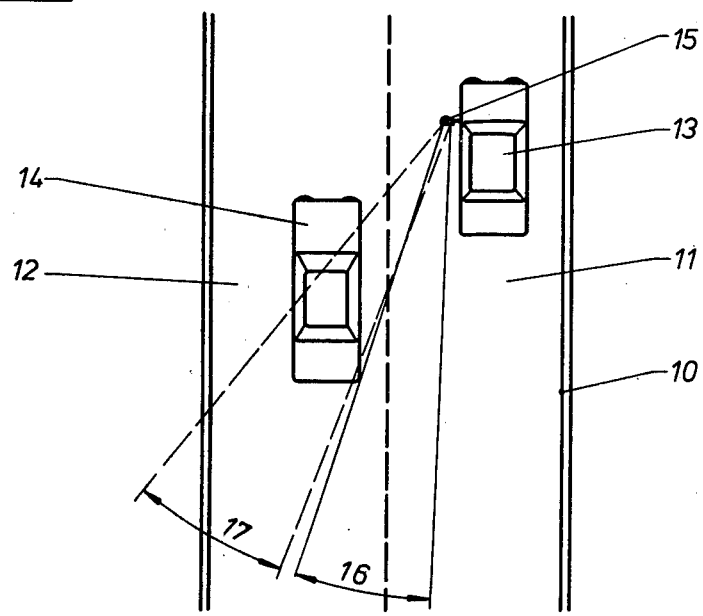

United States Patent [19]

Wunsch et al.

[11] 4,159,866
[45] Jul. 3, 1979

[54] SETTING OR ADJUSTING MEANS FOR REARVIEW MIRRORS OF MOTOR VEHICLES OR THE LIKE

[76] Inventors: Erich Wunsch; Udo Wunsch; Eckart Wunsch, all of Im Hofrain 12, 7141 Schwieberdingen, Baden-Wüorttemberg, Fed. Rep. of Germany

[21] Appl. No.: 725,667

[22] Filed: Sep. 22, 1976

[30] Foreign Application Priority Data

| Sep. 30, 1975 [DE] | Fed. Rep. of Germany | 2543512 |
| Oct. 15, 1975 [DE] | Fed. Rep. of Germany | 2546091 |
| Dec. 23, 1975 [DE] | Fed. Rep. of Germany | 2558457 |
| Mar. 4, 1976 [DE] | Fed. Rep. of Germany | 2608919 |
| Aug. 25, 1976 [DE] | Fed. Rep. of Germany | 2638143 |

[51] Int. Cl.² .............................................. G02B 5/08
[52] U.S. Cl. .................................................... 350/289
[58] Field of Search ............................ 350/279–282, 350/289

[56] References Cited

U.S. PATENT DOCUMENTS

| 3,459,470 | 8/1969 | Hahn | 350/289 |
| 3,475,081 | 10/1969 | Russell | 350/279 |
| 3,664,729 | 5/1972 | Moore | 350/283 X |

Primary Examiner—F. L. Evans
Attorney, Agent, or Firm—Martin A. Farber

[57] ABSTRACT

An adjusting device for rearview mirrors of vehicles for covering rearward and lateral traffic conditions. Mounted off-center on opposite sides in a mirror housing are a mirror plate and a controllable adjustment device by which the mirror plate is simultaneously pivotable about vertical and horizontal axes. In a rest position the mirror plate rests against stops in predetermined lateral and vertical positions.

10 Claims, 30 Drawing Figures

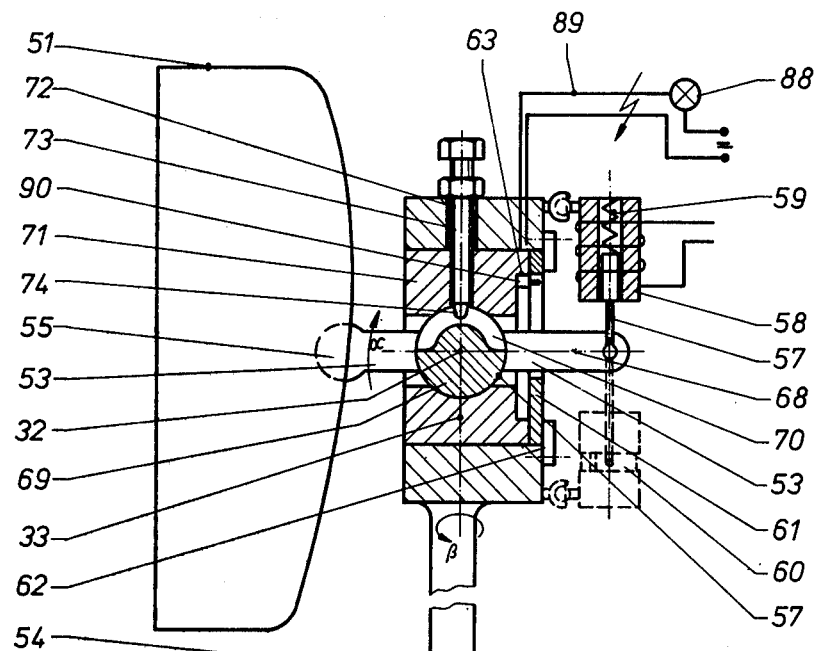
*Fig.8*
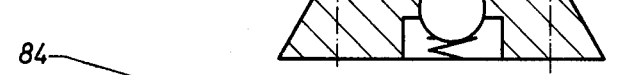
*Fig.11*
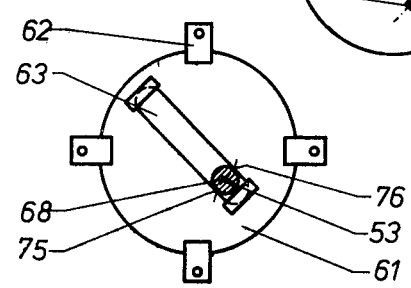
*Fig.9*
*Fig.10*

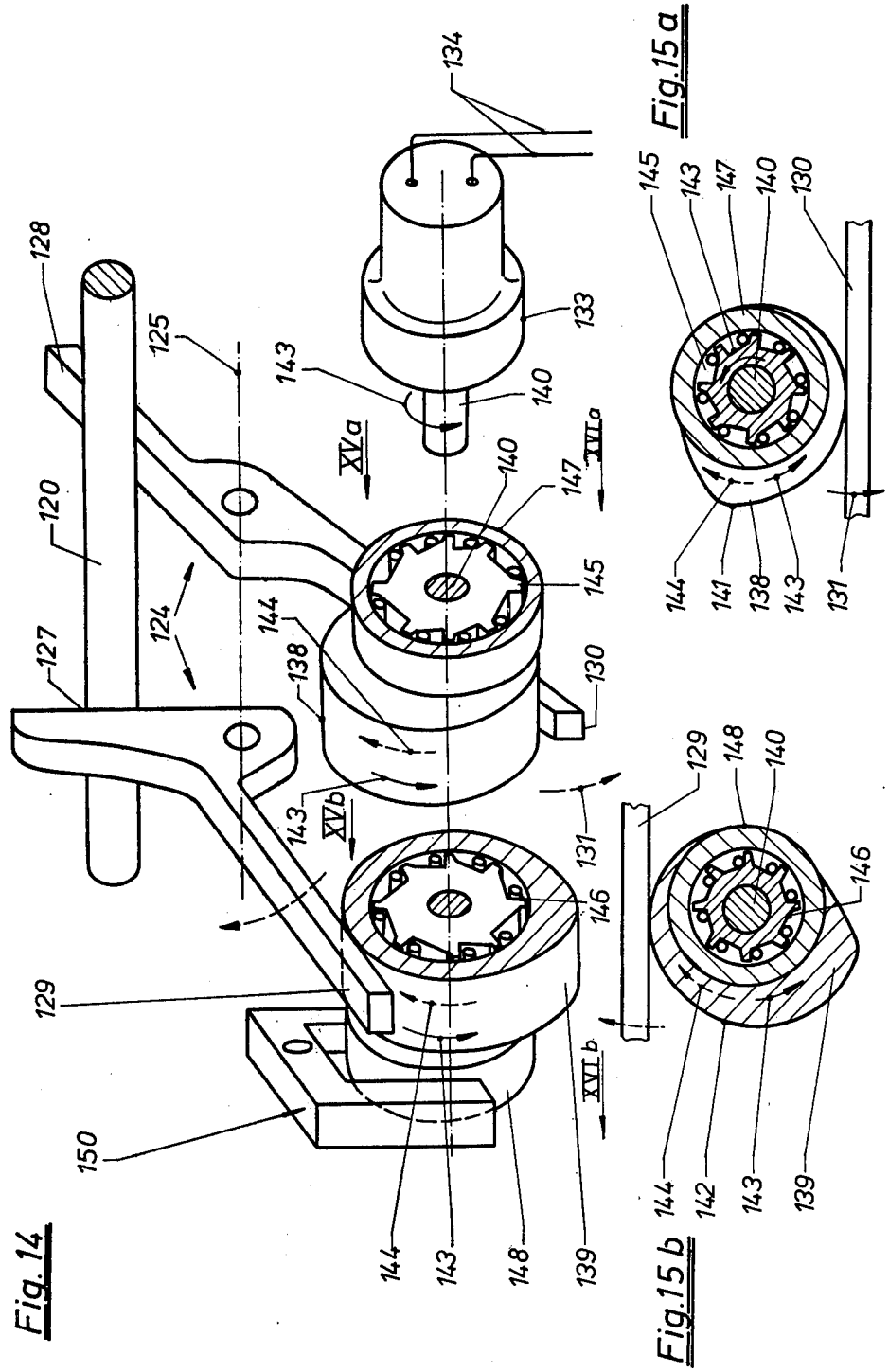

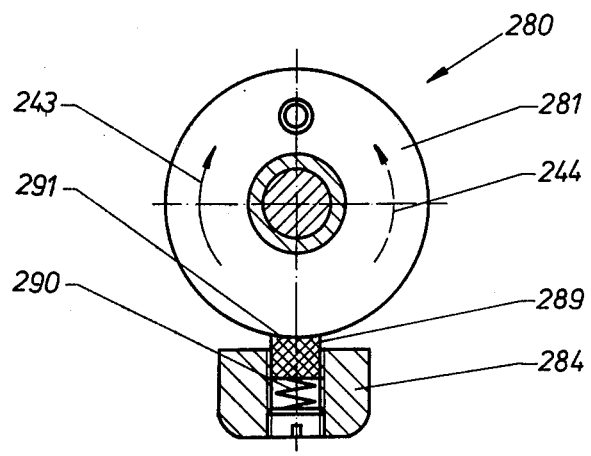
Fig. 24
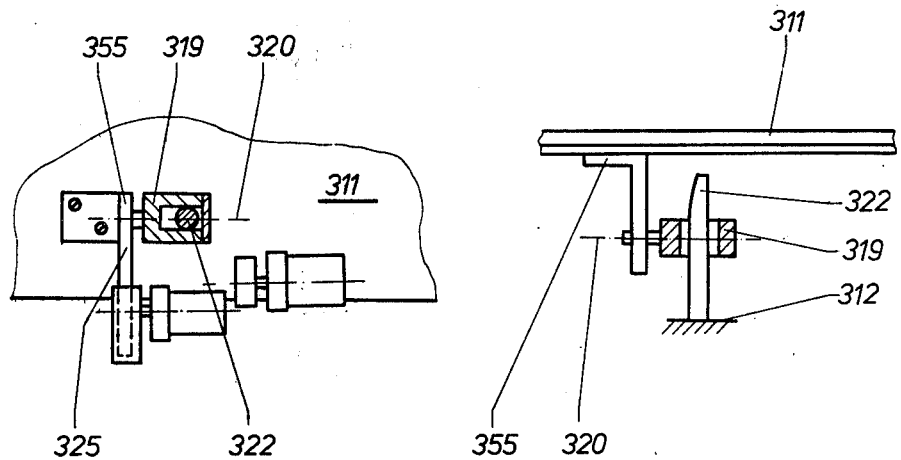
Fig. 22
Fig. 23

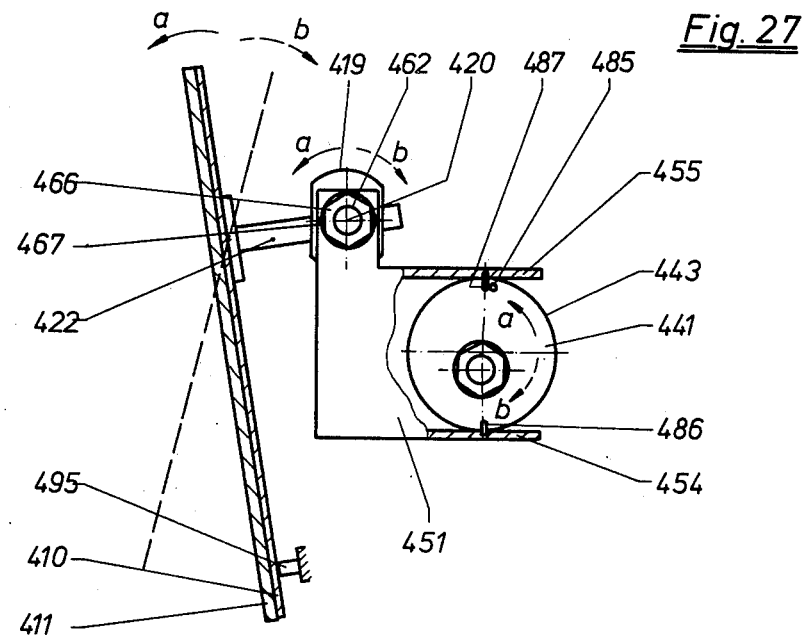
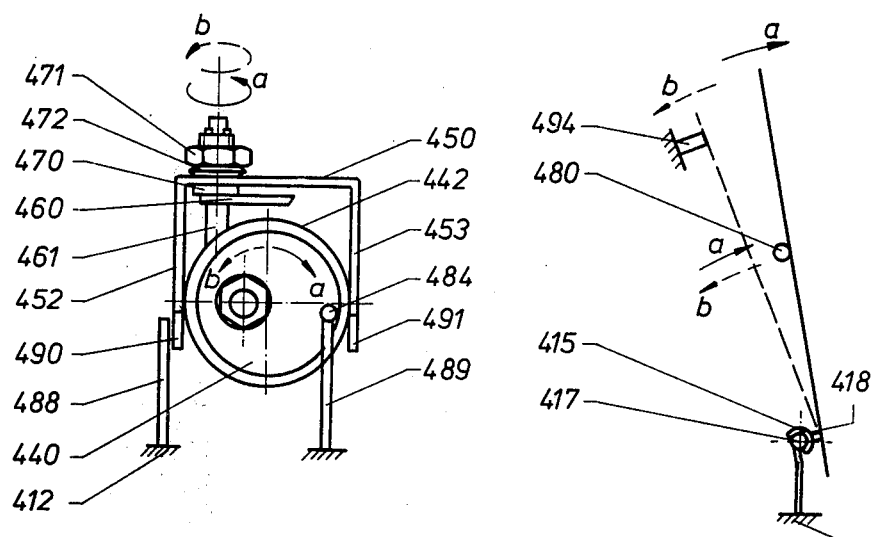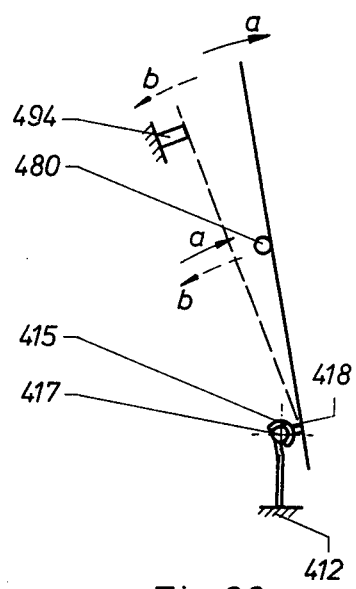

SETTING OR ADJUSTING MEANS FOR REARVIEW MIRRORS OF MOTOR VEHICLES OR THE LIKE

The invention relates to a setting or adjusting means for rearview mirrors of motor vehicles or the like with the aid of which the rearward field of view of the driver can be adapted also when the vehicle is travelling both to his sitting and driving position and to the particular traffic situation.

To solve this problem a great variety of special forms of rearview mirrors has already been proposed but none of them has so far been completely satisfactory. Thus, a rearview mirror is known which has two mirror plates in which in addition to the normal mirror plate, which covers the rearward road area, a second mirror plate is provided which is angled with respect to the first along a substantially vertical line and covers an area lying more to the side of the vehicle so that with this mirror assembly a total of two images results. These two images frequently irritate the driver because simultaneous consideration and correct interpretation of the two images requires special concentration and, in particular, require practice. Experience has shown that many users of such divided mirrors require a long familiarization time before they can use them properly and in some cases never are able to do so. Moreover, the blind angle is still not completely eliminated because motor or pedestrian traffic, for example, directly adjacent a vehicle is still not visible and this is a frequent cause of serious accidents.

The problem underlying the present invention is therefore to construct a rearview mirror so that it provides adequate viewability not only of the rearward road area but also, preferably simultaneously, of the lateral area adjacent the vehicle up to the level of the driver and of the area beneath the lateral field of view and thus substantially eliminates a blind angle. This problem is solved according to the present invention in that the mirror plate is pivotally mounted with respect to the mirror housing by a controllable adjustment device simultaneously both about a substantially vertical axis and about a substantially horizontal axis, with the pivotal mounting and the adjustment device being mounted off-center on opposite sides in the mirror housing and the mirror plate is controllable pivotally into laterally and vertically tilted positions defined by stops.

According to a preferred feature of the present invention the pivotal movement is effected by an electrical lift and/or pull means influencing the position of the mirror plate. Such electromagnetically or electrothermally operating adjusting means may be used with particular advantage because they are simple in construction, reliable, cheap and maintenance-free. They may for example be controlled by the flasher for the direction indicator of the vehicle so that the mirror plate adjustment into the laterally and vertically tilted position takes place whenever the flasher is operated for an overtaking manoeuvre.

The mirror pivoting may be effected in time with the flasher or via an additional switch which is actuated for a brief time when the flasher is switched on.

In a further development of the invention stops are provided for the mirror plate which permit an individual setting of the lateral and/or vertical tilt angle adapted to the particular driver position independently of the adjustability of the mirror housing which is generally provided.

A further individual adjustability of the lateral and vertical tilt angle is provided by the arrangement of a control disc in the control slot of which the pin carrying the mirror plate is guided and limited in its angular deflection by adjustable stops.

A further advantageous embodiment provides that the electrical power supply of the adjusting means is connected to the vehicle electrical system in such a manner that when the vehicle ignition is switched off the mirror plate pivots automatically into the lateral and/or vertical position so that the driver can see the lateral area of the vehicle in the rearview mirror before opening the vehicle door.

To eliminate misinterpretation of the image apparent to the driver in the rearview mirror it may be advantageous to provide a switch which is actuable via the adjusting means and which controls a control indication in the interior of the vehicle which indicates by an optical and/or acoustic signal to the driver in which pivot position the mirror plate is disposed.

In a further development of the invention an independent pivoting of the mirror plate into a laterally or vertically tilted position is possible, which is achieved in that the mirror plate is mounted on an arm which is pivotal both about a substantially vertical axis and about a substantially horizontal axis yet is mounted non-rotatably on a mirror support in the axis perpendicular to said two axes. On the arm an adjusting means engages which acts against a return spring and which includes lever members like tongs which are mounted on a common axis rotatably on the mirror support, one of the legs of which receive between them the arm whilst the other leg of which each cooperate with an independently controllable adjusting drive in such a manner that there results a pivotal movement of the leg receiving the arm about the joint axis such that a displacement of the arm which is guided between the two legs is effected which is transmitted in the form of a tilting motion about the vertical or horizontal axis to the mirror plate. As adjusting drive for producing the adjusting forces for pivoting the tongs-like lever arms mechanical or electrically operating means may be provided. In the simplest case a pull cable or Bowden cable is secured to each leg of the lever members and operable from the interior of the vehicle. In another embodiment the adjusting forces are produced by a cam disc which acts on the respective leg of the associated lever member and which is driven by a gear motor which is controllable from the interior of the vehicle.

In a further development of this feature the cam disc are each connected via an oppositely operating freewheel clutch to a single gear motor in such a manner that in one direction of rotation one cam disc and in the other direction of rotation the other cam disc is coupled in torque-transmitting manner to the gear motor. Thus, one direction of rotation of the gear motor is associated with each cam disc and consequently with each of the two tongs-like lever members. With the arrangement described an adjustment of the mirror plate can be effected in simple manner by the driver comfortably from his driving and sitting position.

According to a further advantageous modification of the invention a constrained guide of the mirror plate is provided in which the pivot levers, articulately connected to the rear plate, are connected via a slip or friction coupling to the adjusting means, so that on failure of the electric motor, adjustment the mirror plate can also be set by hand.

Figure 2:
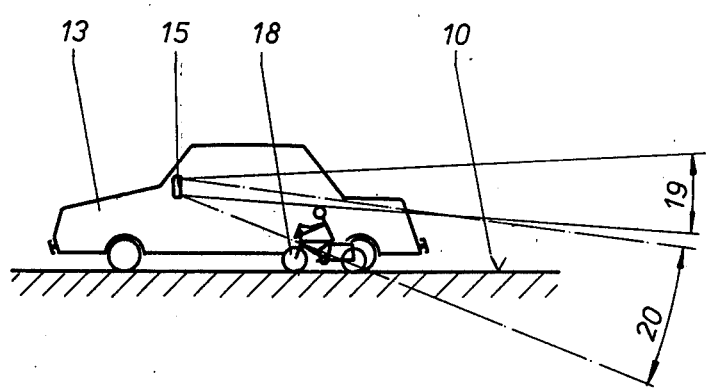
Figure 3:
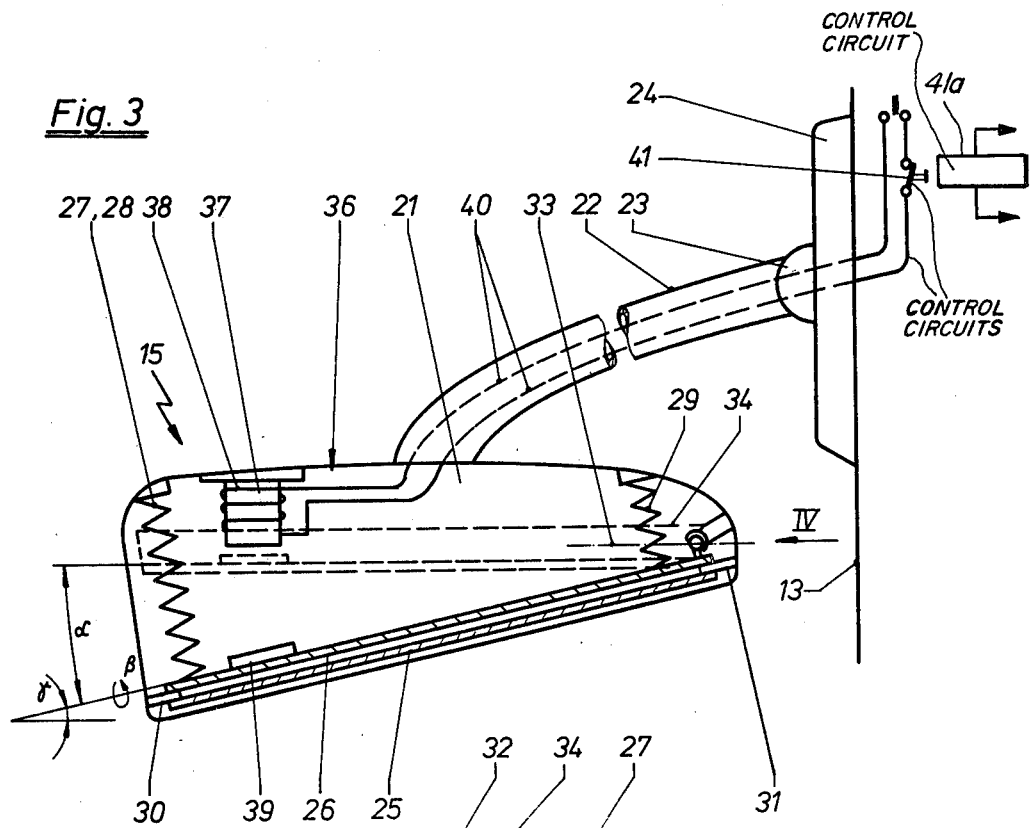
Figure 4:
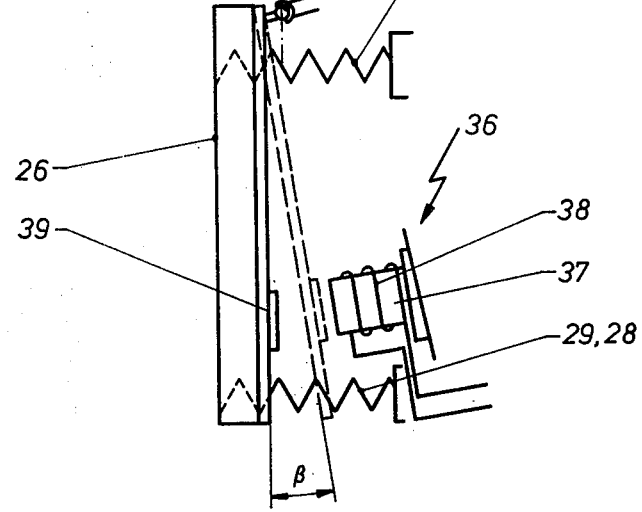
Figure 5:
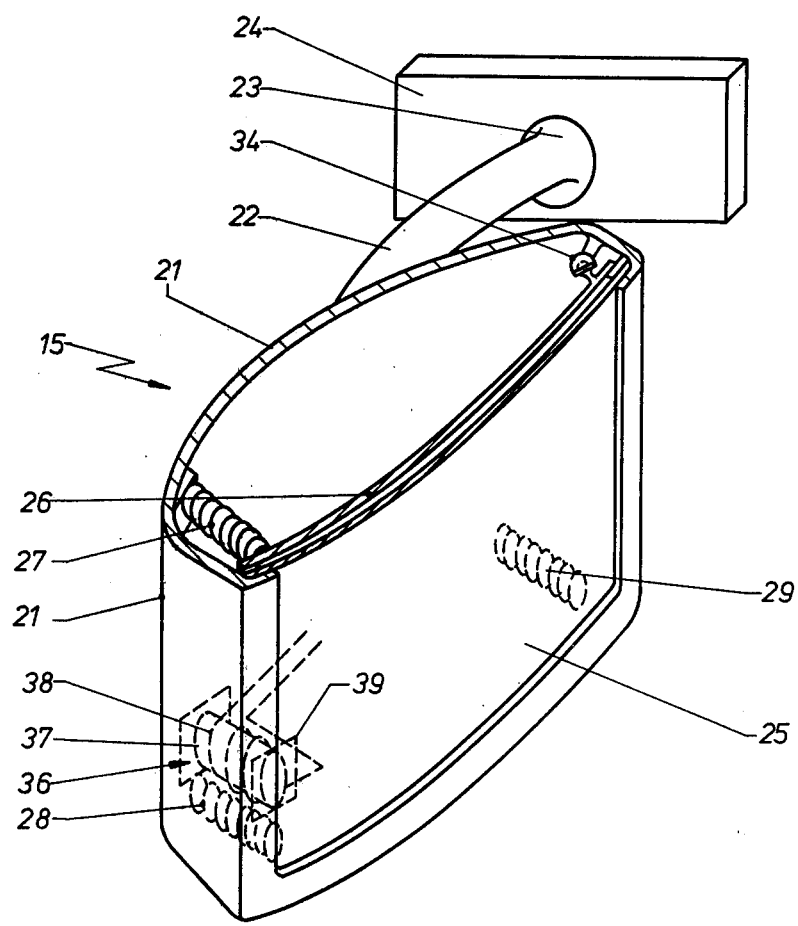
Figure 6:
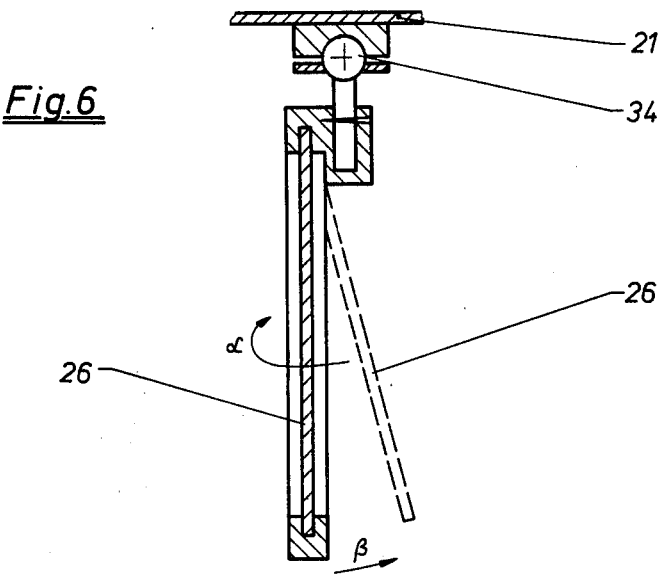
Figure 7:
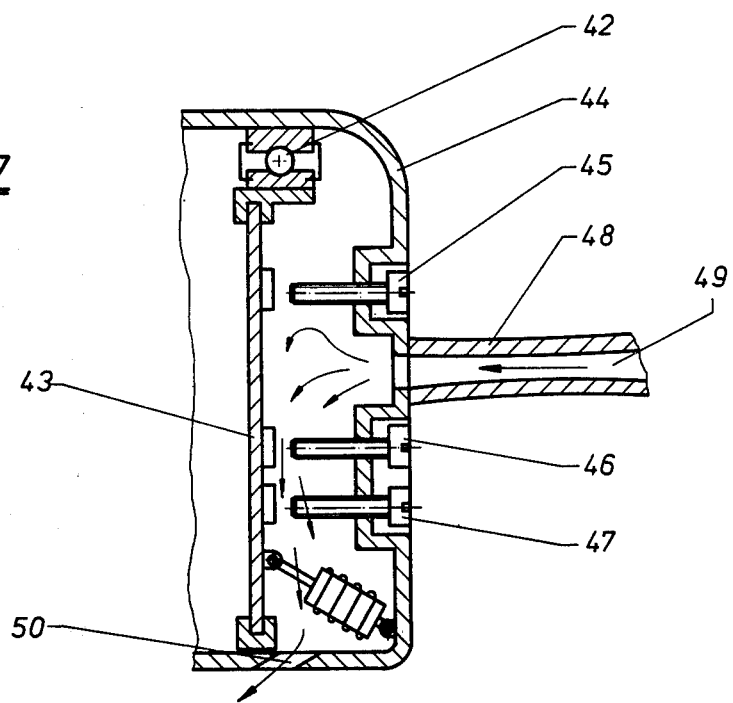
Figure 12:
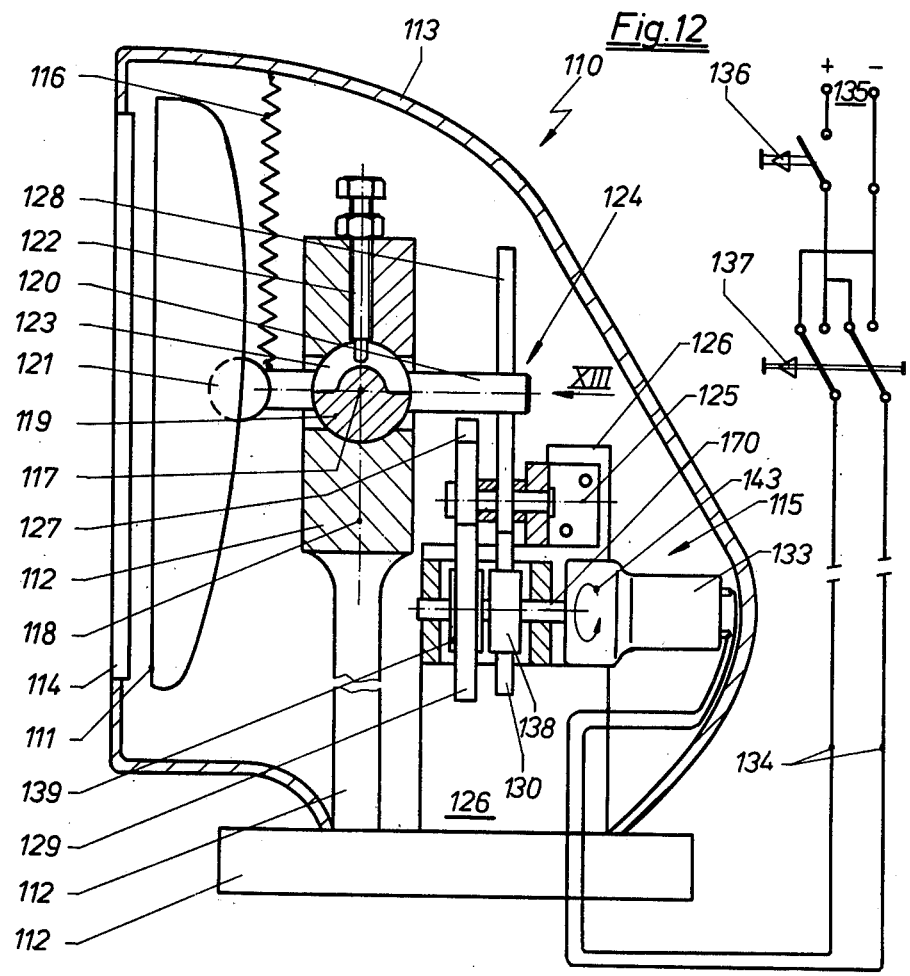
Figure 13:
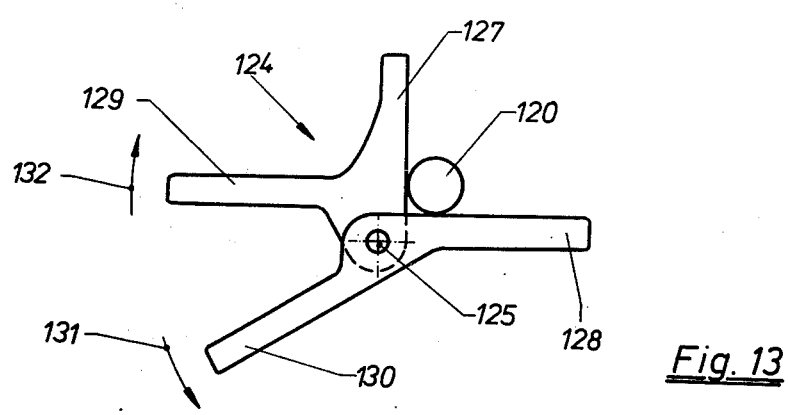
Figure 16:
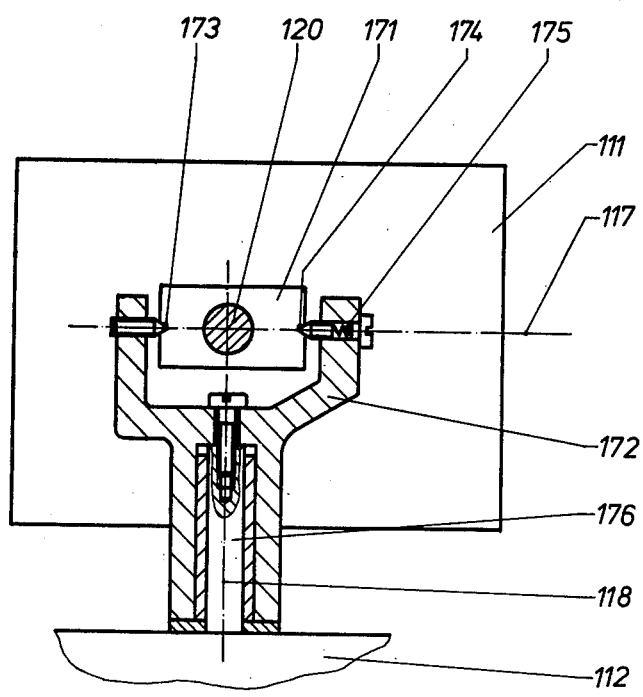
Figure 17:
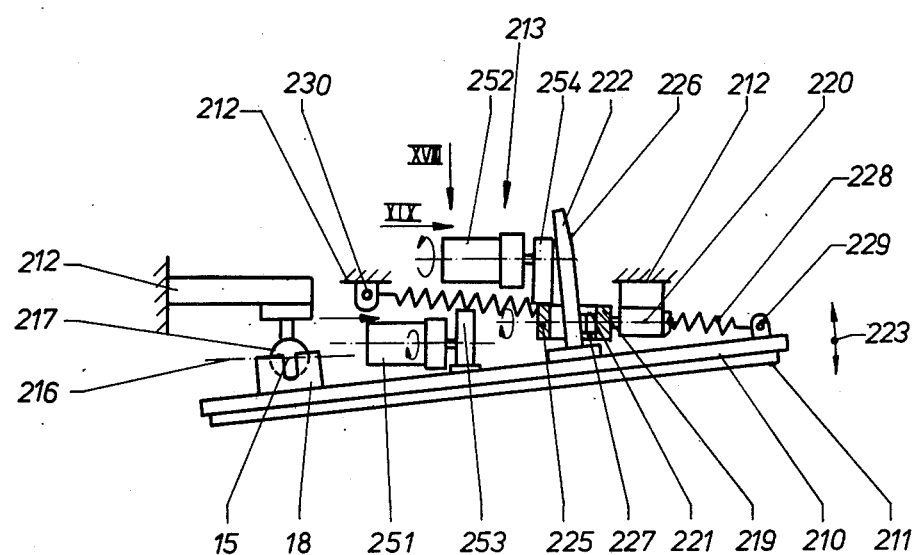
Figure 18:
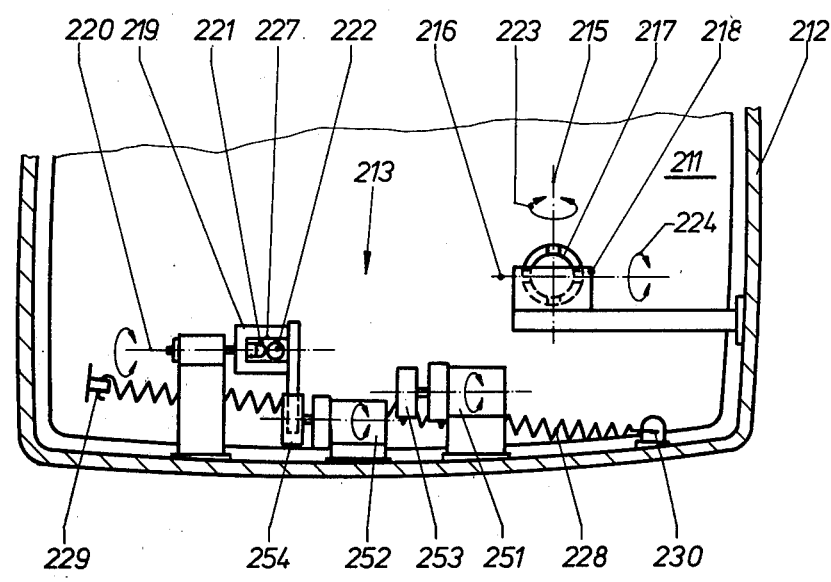
Figure 21:
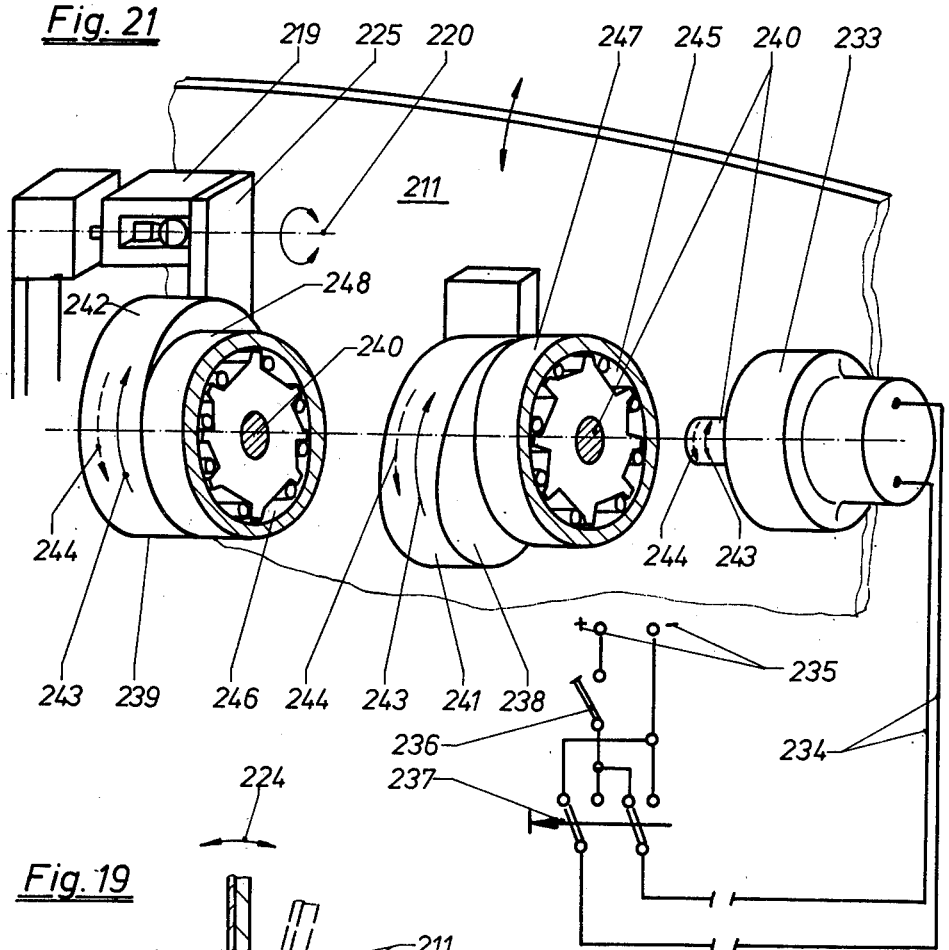
Figure 19:
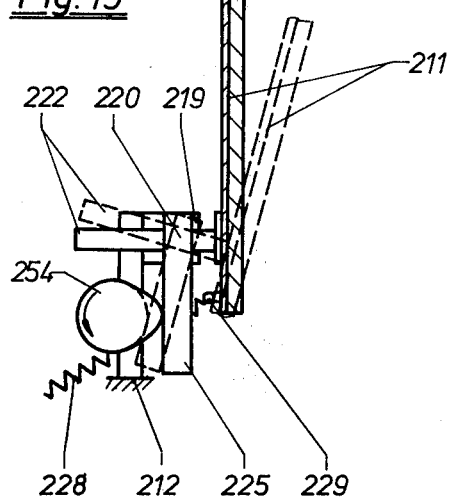
Figure 20:
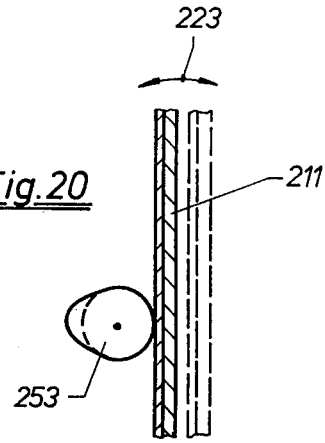
Figure 25:
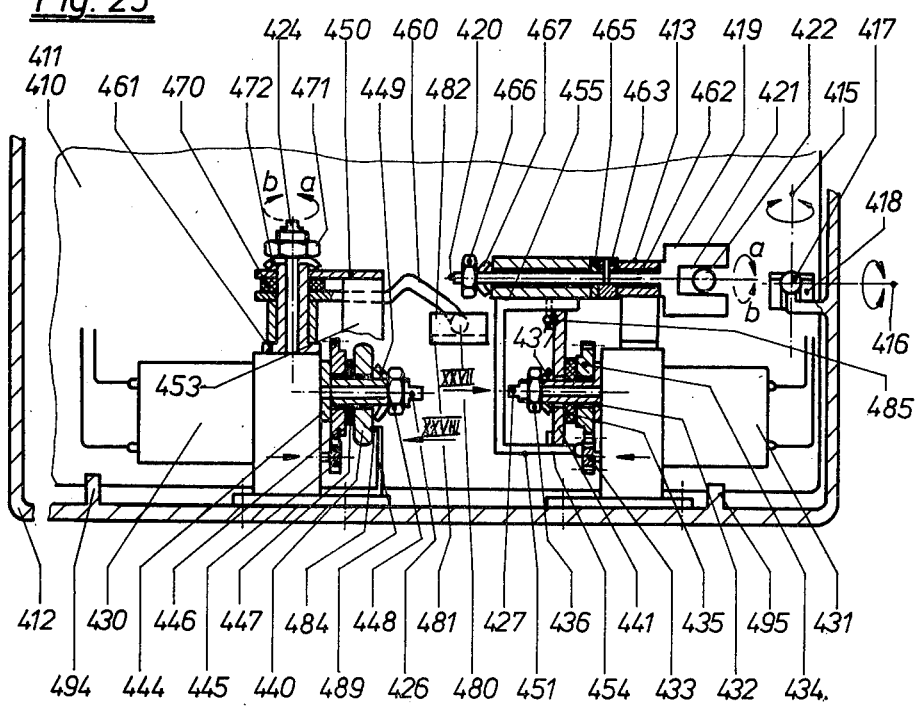
Figure 26:
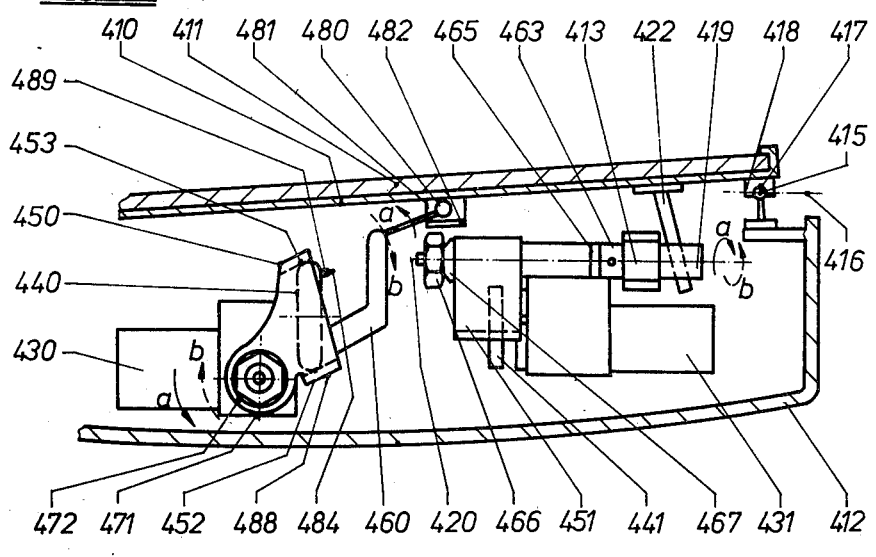

The invention will be explained in detail hereafter with the aid of the examples of embodiment illustrated in the drawings, wherein:

FIG. 1 is a schematic plan view of a road with two vehicles,

FIG. 2 is a schematic side elevation of the left side of a vehicle and a cyclist, FIG. 3 is a partially sectioned plan view of a mirror of a first example of embodiment, FIG. 4 is a side elevation of the mirror plate in the direction of the arrow IV of FIG. 3, FIG. 5 is a perspective view of the mirror in FIG. 3, FIG. 6 is a side elevation of the mirror plate, FIG. 7 is a vertical section through the housing according to a second embodiment, FIG. 8 is a partially sectioned plan view of a mirror according to a third embodiment with rigid mirror plate in the housing, FIG. 9 is a view of the control disc of the mirror in FIG. 8 seen against the direction of travel, FIG. 10 is a view corresponding to FIG. 9 of a modified control disc, FIG. 11 is a view of a control disk according to a fourth embodiment seen against the direction of travel, FIG. 12 is a horizontally sectioned plan view of a mirror according to a fifth embodiment, FIG. 13 is an end elevation of the adjusting element in the direction of the arrow XIII of FIG. 12, FIG. 14 is an enlarged exploded perspective illustration, partially in section, of the adjusting means with adjusting element, FIGS. 15a and 15b each show an end elevation, partially in section, of each free-wheel with cam disc of the adjusting means, in the direction of the arrow XVa and XVb respectively of FIG. 14, FIG. 16 is a schematic partially sectioned rear view of a mirror according to a sixth embodiment, FIG. 17 is a schematic partially horizontally sectioned plan view of the essential parts of a mirror according to a seventh embodiment, FIG. 18 is a rear view in the direction of the arrow XVIII of FIG. 17, FIG. 19 is a detail, seen in the direction and height of the arrow XIX of FIG. 17, FIG. 20 is a detail seen in the direction and height of the arrow XX of FIG. 17, FIG. 21 is a schematic perspective rear view of the essential parts of a mirror according to an eighth embodiment, FIG. 22 is a rear view corresponding substantially to FIG. 18 according to a ninth embodiment, FIG. 23 is a plan view of the parts in FIG. 22, FIG. 24 is an axial partially sectioned end elevation of a return stop of a tenth embodiment, FIG. 25 is a vertically sectioned rear view of a mirror according to an eleventh embodiment, FIG. 26 is a schematic partially horizontally sectioned plan view of the mirror of FIG. 25, FIG. 27 is a schematic end view of the right adjusting means in the direction of the arrow XXVII of FIG. 25, FIG. 28 is a schematic end view of the left adjusting means in the direction of the arrow XXVIII of FIG. 25, FIG. 29 is a schematic plan view of the mirror plate in two positions.

FIG. 1 shows a road 10 with a normal lane 11 and an overtaking lane 12 on which a vehicle 13 is being overtaken by a vehicle 14. The exterior rearview mirror 15 of the vehicle 13 is constructed according to the invention. In the rest position of the mirror 15 the driver of the vehicle 13 has the angle of view 16. The vehicle 14 is not visible in the mirror 15 of the vehicle 13. The angle 17 of view shown in dashed line results for the driver of the vehicle 13 when the mirror 15 has been adjusted out of the rest position about a substantially vertical axis to the left outwardly into a laterally tilted position. The vehicle 14 is then in the field of view of the driver and not in the blind angle.

FIG. 2 shows alongside the vehicle 13, but beneath the lateral angle of view of the driver, a cyclist with bicycle 18. In the rest position of the mirror 15 the vertical angle of view 19 is obtained. The bicycle 18 is not visible for the driver of the vehicle 13. The mirror 15 obviates this blind angle as well. The vertical angle of view 20 results when the mirror is moved out of its rest position about a substantially horizontal axis downwardly into a vertically tilted position. The bicycle 18 is then visible in the mirror 15. Thus, a blind angle may be eliminated by means of the mirror both in the lateral direction and in the vertical direction.

FIGS. 3–6 show a first example of embodiment of the mirror 15. It comprises a housing 21 with a fixed arm 22 thereon as mirror holder which is mounted via a ball joint 23 and a mounting 24 on the vehicle 13. The housing 21 is closed by means of a transparent disc 25 behind which a for example slightly convexly curved mirror plate 26 is arranged which is pressed into its rest position resiliently by means of pressure springs 27, 28 29 (cylindrical coil springs) against edge stops 30, 31 and held free of vibration. The pressure springs 27–29 bear on the rear side of the mirror plate 26 and on the housing 21. The mirror plate 26 is pivotal with respect to the housing 21 about a substantially vertical axis 32 (FIG. 4) and a substantially horizontal axis 33 (FIG. 3) both into a laterally tilted position and into a vertically tilted position and back into the rest position (shown in dashed line in FIGS. 3, 4).

In the rest position the mirror plate 26 extends at an angle γ with respect to a vertical plane extending at right angles to the longitudinal axis of the vehicle. For movement into the laterally tilted position the mirror plate 26 is pivoted outwardly out of the rest position through the angle α about the axis 32. When the mirror plate 26 is pivoted about the horizontal axis 33 a movement plate 26 is pivoted about the horizontal axis 33 a movement is effected downwardly into a vertically tilted position through an angle β (FIGS. 3 and 4). These two motions may be superimposed. The vertical tilting about the angle β results in the vertical angle of view 20 (FIG. 2) and the lateral tilting about the angle α in the lateral angle of view 17 (FIG. 1).

The mirror plate 26 is pivotally mounted in substantially play-free manner about the axes 32 and 33 on the housing 21 substantially in the right upper corner (FIG. 5) by means of a mounting 34. The mounting consists for example of a ball joint or a spring suspension which is not illustrated. An electromagnetic lift/pull means 36 in the housing 21 engages on the back side of the mirror plate 26. It comprises an electromagnet 37 with iron core in the coil 38 which is mounted on the housing 21. Associated with the electromagnet 37 is a plate 39 of magnetizable material which is secured in the lower left corner (FIG. 5) to the back of the mirror plate 26. The electromagnet 37 engages the mirror plate 26 in a zone off-center in the direction of both axes 32, 33 and lying substantially diametrically to the mounting 34 so that the mirror plate 26 may be pivoted out of the rest position about the vertical axis 32 through the angle α outwardly and simultaneously about the substantially horizontal axis 33 through the angle β downwardly. The electromagnet 37 is supplied from the vehicle electrical system by means of lines 40 which are led through the arm 22 and go to the vehicle 13 and may be connected and disconnected by the switch 41 which for example can be arranged on the flasher lever of the vehicle 13.

Alternatively, the electromagnet may be adapted to be coupled via a control circuit (41, 41a) to the flasher switch of the vehicle 13 in such a manner that the electromagnet 37 is continuously switched on when the flasher is switched in the left position and holds the mirror plate 26 in the laterally and vertically tilted position until the flasher lever drops back from the left position into the neutral position, or after release of the flasher switch lever drops into the neutral position, flashing continuing, or be connectable and disconnectable in time with the flasher.

The electromagnet 37 is constructed as a direct-current magnet.

On closure of the switch 41 the mirror plate 26 is attracted through its plates 39 by the core of the energised electromagnet 37, the mirror plate 26 thus being pivoted about the axis 32 through the lateral pivot angle α and at the same time about the axis 33 through the vertical pivot angle β. The result is the dashed-line position with the lateral angle of view 17 and vertical angle of view 20 indicated in the FIG. 3 or 4. When the switch 41 is opened the electromagnet 37 releases the plate 39 and the mirror plate 26 which under the action of the pressure springs 27 and 29 is pressed back into the rest position (FIG. 3) and against the edge stops 30 and 31.

The adjusting means for actuating the mirror plate 26 may also be constructed as mechanical pull means with for example a Bowden cable.

In the second embodiment (FIG. 7) the mirror plate 43 is mounted by a ball bearing 42. On the housing 44 adjustment stops 45, 46 and 47 are disposed which project into the interior of said housing up to the plate back and which fix the maximum lateral pivot angle α outwardly and/or vertical pivot angle β dowardly. The stops 45–47 may be adjusted by the driver. The arm 48 comprises in the interior a hot-air passage 49 which opens into the housing interior 44 and which may be connected at the mounting point of the arm 48 on the vehicle to a hot-air conduit. Through at least one exit opening 50 at the lower housing edge the hot air leaves the opening 50. The supply of hot air from the vehicle interior avoids misting or even freezing of the mirror plate 43 and the protective cover disk.

In the third embodiment (FIGS. 8, 9) a mirror plate is held fixedly in the mirror housing 51 which carries a pin 53 with ball 69 which is pivotally moveable in a ball mounting 71 on the arm 54 for movement about the horizontal axis 33 (angle β) and vertical axis 32 (angle α). An additional pivot joint 55 may be provided between the nip 53 and the mirror housing 51. The axes 32 and 33 intersect each other and the longitudinal center axis 68 of the pin 53 in the centre point of the ball 69 is directed at right angles to the longitudinal center axis 68. The pin 53 articulately engages by an end 57 of a pull and/or push magnet 58 with energizing coil which comprises a plunger armature operating against a pressure spring 59.

Furthermore, an oppositely acting damping device 60 is provided. A control disk 61 is held by means of clamps 62 for rotational adjustment on the mounting 71 and when said clamps are released the control disk 61 may be adjusted in the direction of rotation. The control disk 61 comprises an inclined slot 63 through which the pin 53 passes and which is positioned, inclined within a planar coordinate system (axes 32 and 33), in such a manner that a guiding of the pin 53 along the inclined slot 63 results in a vertical tilting (angle β) downwardly about the axis 33 and simultaneously a lateral tilting (angle α) about the axis 32 outwardly and back. The inclined slot 63 runs from the bottom right to the top left (FIG. 9).

In the rest position of the mirror housing 51 the pin 53 is at the right lower edge of the inclined slot 63 (FIG. 9).

On excitation of the electromagnet 58 the plunger armature is drawn against the pressure spring 59 into the interior, the damping device 60 having an opposite damping effect. The tensile force acting at the end of the pin 53 displaces the latter from the inclined slot 63 from the bottom right to the top left and results in a lateral tilting about the axis 32 through the angle α and a superimposed vertical tilting about the axis 33 through the angle β. On de-energization of the pull magnet 58 the pin 53 is moved back by the expanding pressure spring 59 into the rest position (FIG. 9).

The ball 69 has on a peripheral major circle lying in the plane of the drawing, i.e., within a diametrical plane of the ball containing the ball centre point, the pin longitudinal centre axes 68 and the axis 33, a guide groove in the form of a recess 70. Attached to the mounting 71 is a securing pin 72 whose free end 74 engages in the groove 70. The securing pin 72 is directed at right angles to the longitudinal center axis 68 and towards the ball center point and runs in the direction of the axis 33 so that the bolt axis forms a horizontal pivot axis for the vertical tilting of the housing 51 downwardly and back. Furthermore, a free pivoting of the ball 70 about the axis 32 is possible. On the other hand, due to the engagement in the recess 70 a rotation of the pin 53 about its longitudinal center axis 68 is prevented.

An optical and/or acoustic control indication 88 in the vehicle with a switch 90 connected into its separate or independent supply circuit 89 serves to indicate the mirror position. The switch is mounted on the mounting 71 and projects with its switch member at the upper end (FIG. 8) of the inclined slot 63 into the latter. On movement of the pin 53 in the inclined slot 63 up to the upper end the switch 90 closes, thus closing the circuit 89 independent of the magnet circuit. The control indication 88 indicates to the driver the pivoted-out laterally and/or vertically pivoted position of the mirror.

FIG. 9 shows a modification in which the pin 53 comprises on both sides of the guide edges of the inclined slot 63 on its outer surface two opposing slide faces 75 and 76 directed in the direction of the inclined slot 63, for example, plane chamfers, which are supported at the guide edges of the inclined slot 63 to secure the pin 53 against rotation about its longitudinal center axis 68.

In the modification of FIG. 10 the guide of the pin 53 comprises a vertical slot 66 for the vertical tilting (angle β) and a substantially adjoining horizontal slot 67 for the lateral tilting (angle α).

In the fourth embodiment (FIG. 11) the pin 53 comprises, at the end engaged by the magnet 58 as substantially shown in FIG. 9, two opposite plane faces 78, 79 over which engage two flat legs 81, 82 of a fork 80 at the end of the magnet 58. The flat legs 81, 82 are articulately connected to the pin 53 via a bearing pin 83 which passes transversely through the pin 53. The magnet 58 extends in the direction of the inclined slot 63 and at the end opposite the fork 80 is articulately mounted on the mounting or the mirror arm by means of an end fork 84 about an axis parallel to the bearing pin 83.

In the fifth embodiment (FIGS. 12 to 15), the mirror 110 comprises a mirror plate 111, a mirror holder 112 and a housing 113 with transparent sealing disc 114. For adjustment of the mirror plate 111 about the substantially vertical axis 117 and horizontal axis 118 a remote-controllable adjusting means 115 is provided which acts against a return spring 116. Secured to the mirror plate 111, possibly via a ball joint 121, is a stop pin 120 with ball 119 which is pivotally mounted in the mounting 112. The return spring 116 is secured to the housing 113 and the stop pin 120. The center axis of the stop pin 120 forms a third space axis at the right angles to the vertical axis 117 and horizontal axis 118. The ball 119 is secured against rotation about the latter axis by an arresting pin 122 in accordance with FIG. 8. An adjusting movement of the adjusting means 115 engaging the right end of the stop pin 120 effects as indicated in FIG. 8 a pivoting of the mirror plate 111 about the axes 117 and/or 118.

The adjusting means 115 comprises a tongs member 124 with tongs axis 125 extending in spaced and substantially parallel relationship to the axis of the stop pin 120. The adjusting means 115 with tongs 124 is mounted by means of a plate-like support 126 on the mirror holder 112. The tongs 124 have on each side of the longitudinal line of symmetry a leg 127 and 128 respectively on the one side of the axis 125 and a tongs arm 129 and 130 integral therewith on the opposite side of the axis 125. Both tongs legs 127 and 128 engage the stop pin 120 as if it were to be cut therebetween. A pivoting of the tongs arm 129 or 130 results at the tongs leg 127 or 138 in a deflection of the stop pin about the vertical axis 117 and/or horizontal axis 118. If the tongs arm 129 is held in the position shown in FIG. 13 and only the arm 130 pivoted in the direction of the arrow 131, the stop pin is displaced along the stationary tongs leg 127 upwardly and the mirror plate 111 pivoted about the axis 118, i.e. tilted downwardly. If the other tongs arm 130 is held fixed and the tongs arm 129 pivoted in the direction of the arrow 132, the mirror plate 111 is pivoted inwardly in a lateral direction about the axis 117. The stop pin is engaged by either the leg 128 or the leg 127 and slides along the fixedly held leg 127 or 128. The adjusting forces indicated by the arrows 131, 132 are directed away from each other so that an opening of the tongs arms 129, 130 results in a closing of the tongs legs 127, 128.

The adjusting means 115 further comprises a single electrical reversible direct-current gear motor 133 which engages the tongs arms 129 and 130 and is supplied from the vehicle electrical system 135 via a supply and control line 134 led out through the mirror holder 112. A switch 136 serves for switching on and switching off the motor 133 and a reversal switch 137 for reversing its direction of rotation.

The gear motor 133 acts via eccentric cams, via a first cam disc 138 or the tongs arm 130, and a second cam disk 139 on the tongs arm 129. The two cam discs 138, 139 are held between the arms 129, 130 and coaxially on the driven shaft 140 of the gear motor 133. Each cam disc 138, 139 is in bearing contact with the narrow face of the associated tongs arm 130 or 129, respectively, which faces the opposite tongs arm. The return spring 116 acts in the direction of the axes 117, 118 and presses the stop pin 120 against the tongs legs 127, 128 and thus, the tongs arms 129, 130 against the associated cam disc 139 or 138. the cam discs 138, 139 are so formed that the cam path 142 of the second cam disc 139 increases substantially continuously in the radial direction up to the eccentricity medium in the direction of the first output direction of rotation according to the arrow 143 in FIG. 14 and the cam path 141 of the first cam disc 138 increases in the opposite second output direction of rotation (dashed line arrow 114) of the output shaft 140. A drive movement of the first cam disc 138 in the first drive direction (arrow 143) effects a pivoting of the tongs arm 130 in the direction of the arrow 131. A rotation of the second cam disk 139 in the second opposite output direction of rotation (arrow 144) effects a pivoting of the tongs arm 129 in the direction of the arrow 132.

The rotary movement of the cam discs 138 and 139, which are driven by oppositely installed free-wheels 145 and 146 clamping on the output shaft, is effected by changing the direction of rotation of the gear motor 133 which is coupled to the output shaft 140. The first free-wheel 145 is on the right in FIG. 14 and the second 146 on the left.

When the motor 133 is switched in for the direction of rotation according to the arrow 143 the first cam disc 138 is coupled for torque transmission via its free-wheel 145 to the output shaft 140, whereas the second cam disc 139 runs freely in the same direction of rotation via its associated free-wheel 146 but is not coupled for torque-transmission with the output shaft 140. This free entrained rotation in the direction of the arrow 143 can lead unintentionally to the pivoting of the tongs arm 129 associated with the second cam disc 139 although this is not desired. If the output direction of rotation of the motor 133 is reversed (arrow 144) the conditions are the converse. The cam disc 138 is then freely entrained although it is not in torque-transmitting connection with the output shaft 140. This unintentionally adjusts the tongs arm 130. This unintentional movement due to free entrained rotation must be prevented. For this purpose the cam discs 138, 139 each have a non-positively acting return stop. The first cam disc 138 is blockable by means of its return stop against a rotary movement in the direction of the arrow 144 oppositely to the first torque-transmitting output direction of rotation according to the arrow 143. The second cam disc 139 is blockable by means of its associated return stop against a rotary movement in the same direction as the first output direction of rotation according to the arrow 143. The return stops may take the form of roller free-wheels or the like or alternately sprung friction pins (FIG. 24) or friction discs.

In the sixth embodiment (FIG. 16) the mirror plate 111 is secured to a substantially plate-like support 171 which is pivotally moveable in a fork 172 between two tips 173, 174 about the axis 117.

The fork 172 is pivotally moveable in respect to the mirror holder 112 about the axis 118 via a pin 176 engaging in the fork. The stop pin 120 is secured to the support 171 on the side remote from the mirror plate 111. The adjusting means 115 described engages said stop pin 120.

In the seventh embodiment (FIGS. 7-20) of a mirror the mirror plate 211 is moveably disposed in the mirror housing 212. By means of a remote-controllable adjusting means 213 the mirror plate 211 is pivotal by tilting against the action of a cylindrical coil spring 288 about the spatially substantially vertical 215 and/or horizontal axis 216. This is made possible by a ball joint having a ball 217 fixed on the housing 212 and a ball socket 218 mounted on the back of the mirror plate 211. The mounting is also effected by means of a two-axis joint whose centre is disposed in the continuation of the axis 216 spaced from the ball 217. The two-axis joint comprises a bearing head 219 which is mounted pivotally on the housing 212 about an axis 220 parallel to the horizontal axis 216 and comprises a guide slot 221 which extends substantially perpendicularly to the bearing axis 220. Also part of the two-axis joint is a cylindrical guide pin 222 which extends substantially perpendicularly to the mirror plate plane and is secured to the back of the mirror plate 211. The guide pin 222 passes through the guide slot 221 practically without play in the direction of the slot and transversely thereof so that when the mirror plate pivots in the ball joint 217 or 218 about the axis 215 (arrow 223) a relative displacement occurs between the guide pin 222 and the guide slot 221 substantially in the longitudinal direction of the pin; whereas when the mirror plate tilts about the axis 216 (arrow 224) a positive coupling obtained between the guide slot 221 and guide pin 222 and a tilting movement about the axis 216 and the bearing axis 220 is thus effected (for example via a tab-like lever arm 225 which is connected to the bearing head 219.)

The coil spring 288 engages with one end 229 (FIG. 18) on the mirror plate 211 and is held with its other end 230 on the housing 212.

The adjusting means 213 comprises a first electrical gear motor 251 for the pivoting of the mirror plate 211 in the arrow direction 223 about the axis 215 and a second synchronized gear motor 252 for the tilting adjustment in the arrow direction 224 about the axis 216, these motors being mounted on the housing 212.

Mounted on the output shaft of the first gear motor 251 is an eccentric cam disc 253 as pivoting adjusting element. Mounted on the output shaft of the second gear motor 252 is an eccentric cam disc 254 as tilting adjusting element. The latter bears with the peripheral face on the side of the tab 225 remote from the mirror plate 211. The first cam disc 253 lies with its peripheral face, for example, directly on the back of the mirror plate 211 spaced from the ball joint 217, 218.

The electrical supply lines and control lines of the gear motors 252, 253 are arranged in the housing 212 and, for example, led to a compound slide switch in the interior of the vehicle via which the connection and control of the gear motors 251, 252 can be effected in the desired manner.

In FIGS. 17 and 19 the second cam disc 254 is shown in a rotary position of maximum eccentricity (FIG. 19).

If by switching on the gear motor 252 the cam disc 254 is turned further out of the maximum eccentric position the mirror plate 211 is caused to follow via the spring 228 because the tab 225 is pressed via said spring against the cam disc 254. On minimum eccentricity of the cam disk 254 the tab 225 pivots to the left in FIG. 19. Via the coupling between the tab 225, bearing head 219 with guide slot 221 and guide pin 222 the mirror plate 211 is also correspondingly inclined (dashed line in FIG. 19).

Regarding the pivot position of the mirror plate 211 about the axis 215, FIG. 17 shows an end inward position. The cam disc 253 is in a position of minimum eccentricity. If the gear motor 251 is switched on and the cam disc 253 turned from this position into the maximum eccentricity position the cam disc 253 presses onto the back of the mirror plate 211 and pivots it about the vertical axis 215 (arrow direction 223). The guide pin 222 then moves within the guide slot 221.

In the eighth embodiment (FIG. 21), in contrast to the seventh embodiment, a single electric motor 233 is provided for the tilting adjustment (arrow 224) and the pivoting adjustment (arrow 223), the movements in the two directions of rotation 223 and 224 being brought about by changing the direction of rotation of the electric motor. The takeoff of the gear motor 233 is exactly as in FIG. 14 via the output shaft 240 thereof to two coaxial eccentric cam discs 238, 239 and the associated free-wheels. These two cam discs 238 and 239 move the mirror plate 211 via the associated tab 225 or directly via the eccentric cam 253 in the two directions of rotation according to the arrows 223 and 224.

The ninth embodiment (FIGS. 22,23) corresponds as regards the adjusting means to the eighth embodiment with only one gear motor and two coaxial cam discs driven thereby. There is a kinematic reversal compared with the eighth embodiment so that in FIGS. 22, 23 the bearing head 319 is mounted on the mirror plate 311 for pivotal movement about the bearing axis 320, through an angle piece 355 which is secured with one leg on the mirror plate 311 and accommodates in the other leg the bearing head 319 for pivotal movement about the bearing axis 320. The perpendicularly bracing clamp 325 is mounted on the angle 355. The guide pin 322 is secured to the mirror plate holder 312 instead of to the mirror plate.

In FIG. 24 as tenth embodiment a return stop 280 is shown which can be provided for each cam disc 238, 239. The return stop 280 is in the form of a friction brake with a stationary friction element 289 which is mounted for radial displacement in a stationary holder 284 and is pressed by means of a spring 290 adjustably arranged in the holder 284 and effective in the radial direction with its friction face 291 permanently on a peripheral portion of the stop disc 281. In another embodiment, which is not illustrated, the friction element 289 is not pressed against the stop disc 281 but against a peripheral portion of the cam disc itself or of the shaft section non-rotatably secured thereto. In another embodiment a brake disc which presses on the end face of the cam is used instead of a brake block as friction element.

The eleventh embodiment (FIGS. 25–29) corresponds fundamentally to the seventh embodiment (FIGS. 17 to 20), the description of which applies essentially to the eleventh embodiment as well.

The bearing head 419 is pivotally mounted in the holder 413 fixed with respect to the housing. The guide slot 421 is open to the right. The mirror plate pivoting in the ball joint 417, 418 about the axis 415 leads to a pivoting in the direction of the arrows a and b (FIG. 29) and a mirror plate tilting about the axis 416 to a movement in the direction of the arrows a and b in FIG. 17. For the adjustment two electrical reversible direct-current gear motors 430, 431 are provided each having driven eccentric discs 440 and 441 respectively, the first gear motor 430 with the eccentric disc 440 serving for pivotal adjustment of the mirror plate 411 about the vertical axis 415 and engaging the mirror plate 411 via a U-shaped fork 450, whereas the second gear motor 431 with the eccentric disc 441 serves for the tilting adjustment about the axis 416 and engaged by means of a U-shaped fork 451 on the bearing head 419. For switching on the gear motor 430, 431 a switch is provided on the vehicle dashboard which like a crane switch in logical manner switches the gear motor 430 and/or 431 on corresponding to the desired pivot or tilt position. The two fork legs 452, 453 of the first fork 450 and in similar manner, the two fork legs 454, 455 of the second fork 451 engage over the associated eccentric disc 440 and 441, respectively, within the disk plane and substantially free of play and not spaced from the outer peripheral face 442 and 443, respectively. There is only point contact. On revolution of the first eccentric disc 440 in the right direction (arrow a shown in full line) the right fork leg 453 in FIG. 28 is subjected to the action of the peripheral face 442 of the eccentric disc 440 whereas the opposite fork leg 452 is only in point contact with the peripheral face 442 in substantially play-free manner. When the second eccentric disc 441 revolves in the left direction of rotation (FIG. 27, arrow a) the fork leg 455 is acted upon by the peripheral face 443 of the eccentric disc 441 while the opposite fork leg 454 is only in point contact with said peripheral face 443 in substantially play-free manner.

The left fork 450 in FIGS. 25, 26 is pivotally mounted with respect to the housing 412 about an axis which can extend substantially parallel to the two fork legs 452, 453 and to the axis 415. The first eccentric disc 440 is, seen transversely of the disc plane, in the form of a spherical section so that the outer peripheral face 442 thereof has the form of a circular arc. The fork 450 is operatively coupled to a pivot lever 460 which engages the frame 410 by means of a pull-push mounting but is otherwise freely moveable. The operative coupling in the power path between the fork 450 and the pivot lever 460 and in the power path between the second fork 451 and the bearing head 419 is in each case a slip clutch with adjustable slip behavior. For this purpose the pivot lever 460 and the first fork 450 are arranged on a pivot sleeve 461 and clamped together with interposition of the slip clutch. Similarly, the bearing head 419 and the fork 451 are disposed on a common head shaft 462 and tensioned together with interposition of a slip clutch. The slip behavior of each slip clutch is adjustable via the axial tensioning force in such a manner that the torque necessary to overcome the static friction of the slip clutch is greater than the drive torque necessary for the pivot drive or tilt drive of the mirror plate 411 about the axis 415 or 416, respectively.

The bearing head 419 is non-rotatably mounted on the head shaft 462 which carries a non-rotatably mounted coupling disc 463 and a slip or brake-lining disk 465. The fork 451 is traversed by the head shaft 462 in spaced relationship substantially at right angles to the fork legs 454, 455 thereof and by means of an adjusting nut 466 with interposed spring washers 467 held on the head shaft 462 and pressed with adjustable spring force against the lining disc 465 and the clutch disc 463. Thus, the mirror plate 411 may be tilted manually about the axis 416 with the eccentric disc 441 and fork 451 stationary by pivoting the bearing head 419 with head shaft 462 and coupling disc 463, overcoming the static friction of the lining disc 465, relatively to the fork 451 about the bearing axis 420. The mirror plate 411 can be manually adjusted in this manner with the drive stationary.

The pivot lever 460 and the fork 450 are mounted spaced from the fork legs 452, 453 pivotally on the pivot sleeve 461 which is pivotally moveable on a journal 424. Disposed on the pivot sleeve 461 between the pivot lever 460 and the first fork 450 is a slip or brake lining disc 470. The fork 450 is adapted to be pressed by means of an adjusting nut 471 screwed onto the pivot sleeve 461 with interposed spring washers 472 with adjustable spring force against the lining disc 470 and the pivot lever 460 so that the mirror plate 411, when the eccentric disc 440 and fork 450 are stationary, is pivotal manually about the axis 415 by pivoting the lever 460, overcoming the static friction of the lining disc 470, relatively to the fork 450 about the axis of the pivot sleeve 461. When the gear motor 430 is stationary the mirror plate 411 can thus be pivoted manually also about the axis 415.

The pull-push mounting of the pivot lever 460 comprises a ball 480 at the pivot lever end and said ball bears on the back of the frame 410 of the mirror plate 411. Furthermore, a substantially angular flat spring 481 is mounted on the back of the frame 410. The ball 480 is accommodated between the angle leg 482 of the flat spring 481 and the back of the frame 410, the lever 460 thus exerting a pull-push effect on the mirror plate 411 but otherwise being freely moveable.

Each eccentric disc 440, 441 with fork 450 and 451 respectively comprises an end stop means for disengaging the gear to limit the revolution movement of the eccentric disc 440 and 441 in the two drive directions of rotation (arrows a, b) to a peripheral angle of about 180° and separate the eccentric discs 440 or 441 from the drive. For disengaging the gear a slip clutch is disposed between each of the eccentric discs 440, 441 and its drive member and the slip behavior of said clutch may be adjusted via the axial tensioning force so that the torque necessary to overcome the static friction of the slip clutch is greater than the drive torque necessary for the pivot drive (axis 415) or tilt drive (axis 416) of the mirror plate 411 about the axes 415 and 416.

The first eccentric disc 440 is rotatably mounted on a bush 444 fitted on the motor 430 on a stationary journal 426, a drive gear 446 also being arranged on said bush and meshing with the driven pinion 445. Between the drive gear 446 and eccentric disc 440 on the bush 444 there is a slip or brake lining disc 447 which is adhered to the drive gear 446 or the eccentric disc 440. The eccentric disk 440 is adapted to be pressed by means of an adjusting nut 448 screwed onto the bush 444 with interposed spring washers 449 with adjustable spring force against the lining disk 447 and the drive gear 446 so that when the eccentric disk 440 runs against one of the end stop means and is held fixed, said disc may be uncoupled, overcoming the static friction of the lining disc 447, by the drive gear 446, the latter continuing to rotate with reduced speed.

The eccentric disk 441 is correspondingly rotatably mounted on a bush 432 mounted rotatably on the associated gear motor 431 on a journal 427 and on this bush a drive gear 434 meshing with the driven pinion 433 of the gear motor 431 is also mounted. Arranged on the bush 432 between the drive gear 434 and second eccentric disc 441 is a slip or brake lining disc 435 which is adhered to one of these two. The eccentric disc 441 is pressed by means of an adjusting nut 436 screwed onto the bush 432 with interposed spring washers 437 with adjustable spring force against the lining disc 435 and the drive gear 434.

Each eccentric disc 440, 441 comprises on the end face remote from the gear motor 430 or 431, respectively an axially projecting stop pin or tab 484 and 485, respectively. The second fork 451 carries on the inside of each fork leg 454, 455 a blocking pin 486 or 487 substantially perpendicular thereto which with its free end projects into the path over which the stop pin 485 travels radially up to the eccentric disk centre and when the disc 441 is pivoted in both directions of rotation (arrows a and b) through in each case about 180° peripheral angle forms an end stop for the stop pin. The eccentric disc 441 can thus rotate in both directions according to the arrows a and b only through about 180° peripheral angle in each case. Alternatively, the end stop means may be adapted to the eccentric disc 440. The eccentric disc 440 may have associated therewith two stud bolts 488 and 489 fixed with respect to the housing. The stud bolts 488 and 489 lie on the track through which the stop pin 484 travels when the eccentric disc 440 is pivoted in both directions of rotation according to the arrows a and b through in each case about 180° peripheral angle. The two stud bolts 488 and 489 form with their free upwardly directed end, face the end stop for the stop pin 484.

If the mirror plate 411 is to be pivoted about the axis 415, for example, in the direction of the arrow a (FIG. 29), the gear motor 430 is switched on by correspondingly actuating the switch. The eccentric disc 450 is thus driven via the driven pinion 445, the drive gear 446 and the lining disc 447 in the right direction according to the arrow a in FIG. 28. The eccentric disc 440 rotates with increasing eccentricity and acts with its peripheral face 442 on the fork leg 453. The fork 450 and, coupled thereto via the lining disc 470, the pivot lever 460 are thereby pivoted about the axis of the pivot sleeve 461 in the direction of the arrow a. The ball 480 thus presses against the back of the mirror plate 411 also in the pivot direction a. When the eccentric disc 440 has reached the end position shown in FIG. 28 the stop pin 484 meets the stud bolt 489 and blocks the pivoting. The gear motor 430 then continues to run with reduced speed, since the gear 446 is further driven via the driven pinion 445, the static friction due to the lining disc 447 being overcome so that when the eccentric disc 440 is stationary the drive gear 446 can continue to rotate.

If the mirror plate 411 is to be pivoted in the opposite direction (arrow a) about the axis 415, the switch is correspondingly actuated so that the gear motor 430 drives the eccentric disc 440 in the opposite sense (arrow b, FIG. 28). The fork 450 with the pivot lever 460 pivots about the axis of the pivot sleeve 461 in the opposite direction (arrow b), the mirror plate 411 thus being pivoted into the position shown in dashed lines in FIG. 29.

If the adjusting facility via the gear motor 430 has failed, the mirror plate 411 can be manually pivoted into both positions (FIG. 29). For pivoting the mirror plate 411 in the arrow direction b (FIG. 29) a pressure is exerted on the mirror plate 411 at the mirror edge opposite the ball 417. The mirror plate presses via the ball 480 onto the pivot lever 460 and attempts to pivot the latter about the axis of the pivot sleeve 461. Since when the gear motor 430 is stationary, due to the self-locking of the gear, the eccentric disc 440 is also non-rotatable, on this pivoting of the lever 460 the fork 450 cannot be entrained. However, the pivot lever 460 can pivot relatively to the fork 450 about the axis of the pivot sleeve 461 and change its relative angular position with respect to the fork 450 in that the static friction between the lever 460 and fork 450 is overcome, which is due to the lining disc 470. The pivot lever 460 thus slips in the region of the disc 470 with respect to the fork 450 about the axis of the pivot sleeve 461. When the gear motor 430 is again ready for operation, the mirror plate 411 is pressed manually against a rear stop 94 (FIG. 29) fixed with respect to the housing and the gear motor 430 switched on by corresponding actuation of the switch so that it brings the eccentric disc 440 out of the one end position (FIG. 28) by rotation in the arrow direction b into the other end position. At the latest on reaching this other end position the pivot lever 460 and the fork 450 have again reached the relative rotational position with respect to each other which they had before manual adjustment of the mirror plate 411. By corresponding switching of the switch the eccentric disc 440 is now driven in the arrow direction a, so that the mirror plate 411 is pivoted by the mirror in the arrow direction a or oppositely in the arrow direction b (FIG. 29).

The tilting adjustment of the mirror plate 411 about the axis 416 is effected in similar manner. For this purpose, the switch is correspondingly actuated, for example, so that a mirror adjustment takes place in the arrow direction a (FIG. 27). The eccentric disc 441 is driven in the arrow direction a and the fork leg 455 acted upon by the eccentric disc 441. The fork 451 is pivoted in the arrow direction a about the axis 420, which effects a pivoting of the bearing head 419 with guide pin 422 and thus of the mirror plate 411. The pivotal movement of the eccentric disk 441 is terminated when the stop pin 485 meets the blocking pin 487. The eccentric disc 441 is then stationary, but the gear motor 431 continues to run, with reduced speed. The drive gear 434 is further driven, the static friction of the lining disc 435 being overcome.

If the mirror plate 411 is to be adjusted by the electric motor in the opposite direction (dashed line in FIG. 29) the switch is brought into the corresponding position and the gear motor 431 reversed. This effects a drive of the eccentric disc 441 in the opposite direction (FIG. 27, arrow b) and also of the fork leg 454, the fork 451 and the bearing head 419 thus pivoting about the axis 420 of the head shaft 462 in the arrow direction b until the stop pin 485 meets the blocking pin 486 and blocks the adjustment. The mirror plate 411 has now reached its other end position.

On failure of the adjustment via the gear motor 431 the mirror plate 411 can also be tilted manually, for example, into the position shown in dashed line in FIG. 27. The upper edge of the mirror plate 411 is pressed and the latter pivoted via the guide pin 422, the bearing head 419 with head shaft 462 and coupling disc 463, about the axis 420. The static friction of the lining disc 465 is overcome so that the bearing head 419 can be pivoted relatively to the fork 451 about the axis 420.

When the gear motor 431 is operable again the mirror plate 411 is first pressed manually against the stop 495 (FIG. 27) and the gear motor 431 then switched on for moving the eccentric disc 441 into the end position according to FIG. 27 in which the bearing head and the fork 451 again assume the correct angular position with respect to each other.

The two stops 494, 495 fixed with respect to the housing are arranged at the back of the mirror plate 411. They are formed, for example, by integral portions or housing edges. The stop 494 serves for limiting the maximum pivot angle of the mirror plate 411 when the latter is pivoted manually about the axis 415 in the arrow direction b. The stop 495 serves to limit the maximum pivot angle when the mirror plate 411 is tilted manually about the axis 416 in the pivot direction (arrow a, FIG. 27). The stops 494, 495 are of significance when after failure of the gear motors 430, 431 the exact angular coupling between the fork and associated part to be driven is to be reestablished. Firstly, the mirror plate 411 is pressed by pivot movement and/or tilting movement against the stop 494 and/or 495. The gear motor is then switched on in the direction which effects a power adjustment of the mirror plate in the same sense as previously effected manually. At the latest when the eccentric disc driven by the gear motor has reached its blocked end position in this drive direction of rotation the exact angular position is again obtained between the fork and the part acting on the mirror plate, i.e. pivot lever 460 or bearing head 419. Thus, special manipulations in the interior of the mirror housing and of the mirror mechanism are not necessary.

We claim:

1. A setting and adjusting means for rearview mirrors mounted on a vehicle body comprising a mirror housing adapted to be mounted on the vehicle body, a mirror plate having a rear surface and a front reflecting surface, means for adjustably mounting said mirror plate in said housing for pivotal tilting simultaneously superimposed both about a substantially vertical axis and a substantially horizontal axis, stop means mounted in said housing in a path of pivoting of said mirror plate for directly abuttingly limiting the pivoting of said mirror plate and for defining a rest position of the latter thereagainst, controllable adjusting means upon actuation and release thereof, respectively, for pivotally tilting said mirror plate simultaneously superimposed about both said horizontal and vertical axes into predetermined lateral and vertical positions and against said stop means, respectively, said mounting means for adjustably mounting said mirror plate being disposed at an off-center edge region of said mirror housing and of said mirror plate, said adjusting means for operatively pivoting said mirror plate about said mounting means, said adjusting means for engaging said mirror plate at another edge region of said mirror plate substantially opposite said mounting means, said another edge region being off-center in a direction relative to both said vertical and said horizontal axes, such that upon actuation of said adjusting means said mirror plate pivots about said mounting means simultaneously about said substantially vertical and horizontal axes out of said rest position away from said stop means.

2. The setting and adjusting means for rearview mirrors as set forth in claim 1, further comprising arm means for carrying and pivotally mounting said housing to the vehicle body.

3. The setting and adjusting means for rearview mirrors as set forth in claim 2, wherein said adjusting means is an electromagnet operatively engaging said mirror plate and said mirror housing.

4. A setting and adjusting means for rearview mirrors mounted on a vehicle body, comprising a mirror housing adapted to be mounted on the vehicle body, a mirror plate having a rear surface and a front reflecting surface, means for adjustably mounting said mirror plate in said housing for pivotal tilting simultaneously superimposed about both a substantially vertical axis and a substantially horizontal axis, stop means mounted in said housing in a path of pivoting of said mirror plate for limiting the pivoting of said mirror plate and for defining a rest position of the latter thereagainst, controllable adjusting means upon actuation and release thereof, respectively, for pivotally tilting said mirror plate simultaneously superimposed about both said horizontal and vertical axes into predetermined lateral and vertical positions and against said stop means, respectively, said mounting means for adjustably mounting said mirror plate being disposed at an off-center edge region of said mirror housing and of said mirror plate, including a ball joint mounting at said edge region on said mirror housing, said adjusting means for operatively pivoting said mirror plate about said ball joint mounting, said adjusting means for engaging said mirror plate at another edge region of said mirror plate substantially opposite said mounting means, said another edge region being off-center in a direction relative to both said vertical and said horizontal axes, such that upon actuation of said adjusting means said mirror plate pivots about said ball joint mounting simultaneously about said substantially vertical and horizontal axes out of said rest position away from said stop means, a plurality of pressure springs mounted in said mirror housing pressing said rear surface of said mirror plate at edge regions thereof furthest longitudinally and transversly spaced from said ball joint mounting and from said another edge region of said mirror plate, respectively, against said stop means, said mirror plate being pivotal by said adjusting means against the action of said springs out of said rest position and under the action of said springs back into said rest position.

5. The setting and adjusting device as set forth in claim 4, wherein said mirror plate is substantially square in shape, said mounting means is mounted in an upper corner of said mirror housing adjacent the vehicle body and said adjusting means engages said mirror plate in a lower corner region of said mirror plate remote from said vehicle, said pressure springs engage said mirror plate at least substantially in a region of the two other corners of said mirror plate.

6. The setting and adjustment device for rearview mirrors as set forth in claim 4, wherein said mirror housing has a substantially triangular elongated shape in horizontal cross-section defining a narrower portion adjacent the vehicle body, a wider portion remote from the vehicle body and a rounded back, said mirror housing having a substantially rectangular square shape in vertical cross-section, said mirror housing has U-shaped flanges forming an opening at a front portion thereof, said stop means constitute edge stops in said housing spaced from said flanges, a transparent disc disposed between said edge stops and said U-shaped flanges, said mirror plate is disposed abutting a rear side of said edge stops in said rest position, said ball joint mounting is secured in said narrower portion of said housing at substantially an uppermost portion thereof and includes a fixed spherical recessed bearing connected to said housing and a ball shaped member secured to said mirror plate, said ball shaped member is pivotably rotatably disposed in said spherical recessed bearing, said plurality of pressure springs constitute three cylindrical coil springs mounted on the back of said housing at said wider portion at an uppermost and a lowermost portion thereof, and at said narrower portion at a lower portion thereof, respectively, said springs extend to said rear surface of said mirror plate and press said mirror plate in a forward direction against said edge stops, said controllable adjusting means comprises a single electromagnet having a core mounted on said back of said housing substantially at the lowermost portion of said wider portion, said core points toward said mirror plate, and a magnetizable plate is secured to said mirror plate at said rear surface thereof operatively facing substantially opposite said core, said magnetizable plate and said core being disposed off-center with respect to both said horizontal and vertical axes and substantially diametrically disposed with respect to said ball joint mounting, said mirror plate being moveable toward said core upon actuation of the latter simultaneously effecting superimposed pivoting thereof about said horizontal and said vertical axes.

7. The setting and adjusting device for rearview mirrors as set forth in claim 6, further comprising
a hollow fixed arm secured to the back of said housing,
a second ball joint connects said fixed arm to said vehicle body,
electrical wires operatively connected to said electromagnet extend through said hollow fixed arm.

8. The setting and adjusting device for rearview mirrors as set forth in claim 7, further comprising
flasher switch means connected to said electric wires and operatively arranged on a flasher lever of a vehicle for actuation of said adjusting means when said flasher switch means is switched on.

9. The setting and adjusting device for rearview mirrors as set forth in claim 8, further comprising
control circuit means for coupling said electromagnet via said electric wires to said flasher switch means for continuously switching on said electromagnetic when said flasher switch means is switched in a left position and thereby for holding said mirror plate in the laterally and vertically tilted position until said flasher lever drops back from the left position into a neutral position, and after release of the flasher lever drops into the neutral position, flashing continuing, and disconnectable with time, respectively.

10. The setting and adjusting device for rearview mirrors as set forth in claim 6, wherein
said electromagnet constitutes a direct-current magnet.

* * * * *

UNITED STATES PATENT AND TRADEMARK OFFICE
CERTIFICATE OF CORRECTION

PATENT NO. : 4,159,866
DATED : July 3, 1979
INVENTOR(S) : Erich Wunsch et al

It is certified that error appears in the above-identified patent and that said Letters Patent are hereby corrected as shown below:

Item [76] the word "Baden-Wüorttemberg,"
should be --Baden-Württemberg,--

Signed and Sealed this

Third Day of March 1981

[SEAL]

Attest:

RENE D. TEGTMEYER

*Attesting Officer*     *Acting Commissioner of Patents and Trademarks*